(12) United States Patent
Betts

(10) Patent No.: US 7,099,401 B2
(45) Date of Patent: Aug. 29, 2006

(54) DISCRETE MULTITONE INTERLEAVER

(75) Inventor: William L. Betts, St. Petersburg, FL (US)

(73) Assignee: Paradyne Corporation, Largo, FL (US)

(*) Notice: Subject to any disclaimer, the term of this patent is extended or adjusted under 35 U.S.C. 154(b) by 1005 days.

(21) Appl. No.: 09/736,353

(22) Filed: Dec. 14, 2000

(65) Prior Publication Data

US 2001/0031017 A1 Oct. 18, 2001

Related U.S. Application Data

(60) Provisional application No. 60/170,891, filed on Dec. 15, 1999.

(51) Int. Cl.
*H04L 27/04* (2006.01)
*H04L 27/12* (2006.01)
*H04L 27/20* (2006.01)

(52) U.S. Cl. .................. 375/295; 375/259

(58) Field of Classification Search ........... 375/265, 375/135, 146, 298, 132, 275, 262, 340, 341, 375/295; 714/786, 792, 794, 795
See application file for complete search history.

(56) References Cited

U.S. PATENT DOCUMENTS

| | | | | |
|---|---|---|---|---|
| 4,635,278 A | * | 1/1987 | Maloon et al. | 375/272 |
| 4,641,327 A | | 2/1987 | Wei | 375/114 |
| 4,660,214 A | | 4/1987 | Pahlavan et al. | 375/39 |
| 4,677,625 A | * | 6/1987 | Betts et al. | 714/792 |
| 5,052,000 A | * | 9/1991 | Wang et al. | 714/758 |
| 5,508,752 A | * | 4/1996 | Kim et al. | 348/608 |
| 5,596,604 A | | 1/1997 | Cioffi et al. | 375/260 |
| 5,659,578 A | | 8/1997 | Alamouti et al. | 375/261 |
| 5,751,741 A | * | 5/1998 | Voith et al. | 714/758 |
| 5,761,249 A | * | 6/1998 | Ben-Efraim | 375/341 |
| 5,914,988 A | * | 6/1999 | Hu et al. | 375/341 |
| 5,930,300 A | | 7/1999 | Betts et al. | 375/285 |

(Continued)

FOREIGN PATENT DOCUMENTS

EP 000673163 A1 * 3/1994

OTHER PUBLICATIONS

International Telecommunication Union, "Asymmetrical Digital Subscriber Line (ADSL) transceivers", Series G: Transmission Systems and Media, Digital Systems and Networks, Digital transmission systems-Access networks; G.992.1 (Jun. 1999).

(Continued)

*Primary Examiner*—Jean B Corrielus
(74) *Attorney, Agent, or Firm*—Thomas, Kayden, Horstemeyer, Risley, LLP

(57) ABSTRACT

A discrete multitone interleaver system, including an interleaver and deinterleaver, are provided for efficiently communicating data despite noise affecting a Discrete Multitone modulation (DMT) system. The discrete multitone interleaver includes a convolutional encoder capable of receiving a plurality of bits on tones and capable of outputting a convolutionally encoded plurality of bits and a synchronized dual skipping switch capable of passing the plurality of bits on tones to the convolutional encoder in a non-sequential order and capable of outputting the convolutionally encoded plurality of bits in the same non-sequential order. The discrete multitone deinterleaver includes a convolutional decoder capable of receiving a plurality of bits on tones and capable of outputting convolutionally decoded bits and a synchronized dual skipping switch capable of passing the bits to the convolutional decoder in a non-sequential order and capable of outputting the convolutionally decoded plurality of bits in the same non-sequential order.

6 Claims, 10 Drawing Sheets

U.S. PATENT DOCUMENTS

| | | | |
|---|---|---|---|
| 5,933,431 A | 8/1999 | Ko | 370/476 |
| 5,949,796 A | 9/1999 | Kumar | 370/529 |
| 5,983,388 A | 11/1999 | Friedman et al. | 714/776 |
| 6,067,646 A | 5/2000 | Starr | 714/701 |
| 6,084,906 A | 7/2000 | Kao et al. | 375/220 |
| 6,144,695 A | 11/2000 | Helms et al. | 375/222 |
| 6,151,690 A | 11/2000 | Peeters | 714/701 |
| 6,233,286 B1* | 5/2001 | Wei | 375/265 |
| 6,351,832 B1* | 2/2002 | Wei | 714/701 |
| 6,473,418 B1* | 10/2002 | Laroia et al. | 370/344 |
| 6,493,402 B1* | 12/2002 | Fimoff | 375/321 |
| 6,529,558 B1* | 3/2003 | Fimoff et al. | 375/262 |
| 6,608,870 B1* | 8/2003 | Fimoff | 375/270 |
| 6,625,219 B1 | 9/2003 | Stopler | 375/240 |
| 6,668,023 B1 | 12/2003 | Betts | 375/285 |
| 6,687,310 B1* | 2/2004 | Fimoff et al. | 375/265 |
| 6,823,002 B1 | 11/2004 | Betts | 375/219 |
| 6,915,472 B1* | 7/2005 | Jones, IV et al. | 714/746 |
| 6,917,655 B1* | 7/2005 | Fimoff et al. | 375/265 |
| 2003/0012290 A1* | 1/2003 | Fimoff et al. | 375/265 |

OTHER PUBLICATIONS

G.gen.bis—Robuster Tone Ordering and Flexible Pilot Allocation, Jun. 21-Jul. 2, 1999.

G.gen-bis—More Robust Tone Ordering, in the Presence of real AM RFI, Feb. 5-9, 2001.

\* cited by examiner

Discrete Multitone Interleaver
(First Embodiment)

Discrete Multitone Interleaver
(Second Embodiment)

Discrete Multitone Interleaver
(Preferred Embodiment)

Discrete Multitone Deinterleaver
(First Embodiment)

Discrete Multitone Deinterleaver
(Preferred Embodiment)

DISCRETE MULTITONE INTERLEAVER

CROSS-REFERENCE TO RELATED APPLICATION

This application claims priority to copending U.S. provisional application entitled, "Discrete Multi-Tone Trellis Interleaver," having Ser. No. 60/170,891, filed Dec. 15, 1999, which is entirely incorporated herein by reference.

TECHNICAL FIELD

The present invention generally relates to communications and modems, and more particularly to a discrete multitone interleaver system and method for efficiently minimizing noise distortion and enhancing data transmission communications.

BACKGROUND OF THE INVENTION

Communications devices, particularly those that implement digital subscriber line (DSL) technologies (e.g., T1 and xDSL, including SDSL, HDSL, ADSL, etc.), transmit high speed data using analog signals over telephone connections, which are typically copper wire pairs. The connections and equipment are subject to adverse impulse noise. Impulse noise events are likely correlated over several symbol (or baud) periods of the DSL modulation. Correlated noise or distortion undesirably will significantly degrade performance of the decoder associated with a receiver.

In order to minimize the adverse affects of noise, various forward error correction coding techniques (also known as convolutional coding) have been developed and employed in the past. Typically, in forward error correction coding, at the transmitter, data bits are encoded by adding redundant bits systematically to the data bits so that, normally, only predetermined transitions from one sequential group of bits (corresponding to a symbol, or baud) to another are allowed. There is an inherent correlation between these redundant bits over consecutive bauds. At the receiver, each baud is tentatively decoded and then analyzed based on past history, and the decoded bits are corrected, if necessary.

One well known and widely accepted error coding technique is trellis coded modulation (TCM), which is a form of convolutional coding that is optimized according to a specific modulation scheme. A TCM encoder is situated at the transmitter, and a TCM decoder is situated at the receiver. TCM is highly desirable since it combines the operations of modulation and error coding to provide effective error control coding without sacrificing power and bandwidth efficiency. The TCM decoder essentially averages the noise over more than one of the symbols. However, noise that is correlated over the constraint length of the trellis code will effectively degrade performance. In many cases, correlated noise causes the trellis decoder to perform worse than if the receiver employed no trellis coding at all.

As examples, U.S. Pat. No. 5,659,578 to Alamouti et al. and U.S. Pat. No. 4,677,625 to Betts et al. describe the concept of TCM. The latter describes a distributed trellis encoder that can be used to spread symbols associated with a data stream over time across successive symbol (baud) periods. This distributed encoder significantly improves performance by making the transmissions less susceptible to errors resulting from imposition of correlated noise. U.S. Pat. Nos. 5,659,578 and 4,677,625 are entirely incorporated herein.

The various DSL technologies employ a variety of line coding, e.g. 2 Binary, 1 Quaternary (2B1Q), Quadrature Amplitude and Phase modulation (QAM), Carrierless Amplitude and Phase (CAP) modulation, and Discrete Multitone (DMT). DMT is now the standard line coding for Asymmetrical Digital Subscriber Line (ADSL) as specified in international standards published by the ITU (International Telecommunication Union) as Recommendations G.992.1 Series G: Transmission Systems and Media, Digital Systems and Networks, Digital Transmission Systems—Access Networks ADSL Transceivers, and G.992.2 Splitterless ADSL transceivers. G.992.1 and G.992.2 are available from the ITU, Geneva, Switzerland, at http://www.itu.int are entirely incorporated herein.

Discrete MultiTone modulation (DMT) is a Frequency Division Multiplex (FDM) type of modulation in which an incoming bit stream is multiplexed into a number of sub-carriers or sub-channels. DMT as used in ADSL enables a digital subscriber technology capable of delivering high-speed digital information over existing unshielded twisted pair copper telephone lines DMT encodes data on multiple sub-carriers, referred to as tones, that are then converted to time domain signals for transmission by an Inverse Discrete Fourier Transform (IDFT). An additional level of line coding, e.g. QAM, can be employed within each of the tones. A DMT trellis encoder generally codes between adjacent tones. DMT uses a Discrete Fourier Transform (DFT) to demodulate the tones.

The DMT 16-state trellis code constraint length is approximately four 4-dimensional symbols. 4-dimensional symbols are encoded as two 2-dimensional constellations on two tones. Four 4-dimensional symbols are encoded over eight tones DFT suffers from performance limitations including sinx/x coupling of energy between adjacent tones. DMT convolutional encoders operate "serially" on mapped constellations such that consecutively generated constellations are mapped to adjacent tones. (Sin x)/x coupling allows noise on one tone to effect adjacent tones. Correlated noise on adjacent tones, particularly that within the DMT code constraint length, contributes to multiple metric calculations in the trellis decoder. Correlated noise in consecutive metric calculations causes negative gain and can result in performance worse than if no coding was employed.

DSL technologies are still in a state of infancy and are being improved over time by engineers and designers. The industry still needs ways to further enhance DSL communications and, in particular, ways to minimize the adverse effects of impulse noise and correlated noise. Thus, a heretofore unaddressed need exists in the industry to address the aforementioned deficiencies and inadequacies.

SUMMARY OF THE INVENTION

The present invention provides a system for a discrete multitone interleaver and a method for interleaving across DMT tones.

The discrete multitone trellis interleaver spreads trellis symbols across several carrier tones such that the metrics in the receiver are not correlated. The depth of the interleaver will determine the number of tones used to spread the symbol. Noise impacting adjacent tones will not appear in the metric calculations until a number of trellis symbols later. The number being equal to the depth of the interleaver. In effect, the discrete multitone trellis interleaver causes the symbols to skip over correlated noise.

Briefly described, in architecture, the system can be implemented in a transmitter and a receiver as follows. The discrete multitone interleaver transmitter includes a convolutional encoder capable of receiving a plurality of bits on tones from a bit extractor buffer and capable of outputting a convolutionally encoded plurality of bits. The transmitter also includes a synchronized dual skipping switch capable of passing the plurality of bits from the bit extractor buffer to the convolutional encoder in a non-sequential order and capable of outputting the convolutionally encoded plurality of bits in a non-sequential order.

The discrete multitone deinterleaver receiver includes a convolutional decoder capable of receiving a plurality of bits on tones and capable of outputting a convolutionally decoded plurality of bits. The receiver also includes a synchronized dual skipping switch capable of passing the plurality of bits on tones to the convolutional decoder in a non-sequential order and capable of outputting the convolutionally decoded plurality of bits in a non-sequential order.

The present invention can also be viewed as providing a method for transmitting discrete multitoned interleaved data. In this regard, the method of transmitting and receiving can be broadly summarized by the steps outlined below.

In regard to transmitting discrete multitone interleaved data, the method includes receiving a first plurality of bits on a first tone from a bit extractor buffer through a synchronized dual skipping switch; receiving a second plurality of bits on a second tone from the bit extractor through the synchronized dual skipping switch, wherein the second tone is not adjacent to the first tone; convolutionally encoding the first and second pluralities of bits; and outputting the convolutionally encoded first and second pluralities of bits through the synchronized dual skipping switch.

In regard to receiving discrete multitoned interleaved data, the method includes receiving a first plurality of bits on a first tone through a synchronized dual skipping switch; receiving a second plurality of bits on a second tone through the synchronized dual skipping switch, wherein the second tone is not adjacent to the first tone; convolutionally decoding the first and second plurality of bits; and outputting the convolutionally decoded first and second pluralities of bits through the synchronized dual skipping switch.

In addition to other advantages described above, the discrete multitone trellis interleaver provides improved coding gain. The discrete multitone trellis interleaver provides these advantages without an increase in delay since the interleaving occurs between tones rather than between symbols in time.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

In FIG. 3, the constellation encoder and gain scaler includes an interleaved convolutional encoder. The first embodiment of the discrete multitone interleaver is implemented by the interleaved convolutional encoder of the constellation encoder and gain scaler of FIG. 3.

FIG. 5 shows a first embodiment of the discrete multitone interleaver. The convolutional encoder of the first embodiment includes a variable unit time delay.

In FIG. 7, the constellation encoder and gain scaler includes a variable number of prior art convolutional encoders associated with a synchronized dual switch that implements the second embodiment of the discrete multitone interleaver.

In FIG. 8, the constellation encoder and gain scaler includes a convolutional encoder and mapper associated with a variable dual skipping switch that implements the preferred embodiment of the discrete multitone interleaver.

DETAILED DESCRIPTION OF THE PREFERRED EMBODIMENT

Figure 1:
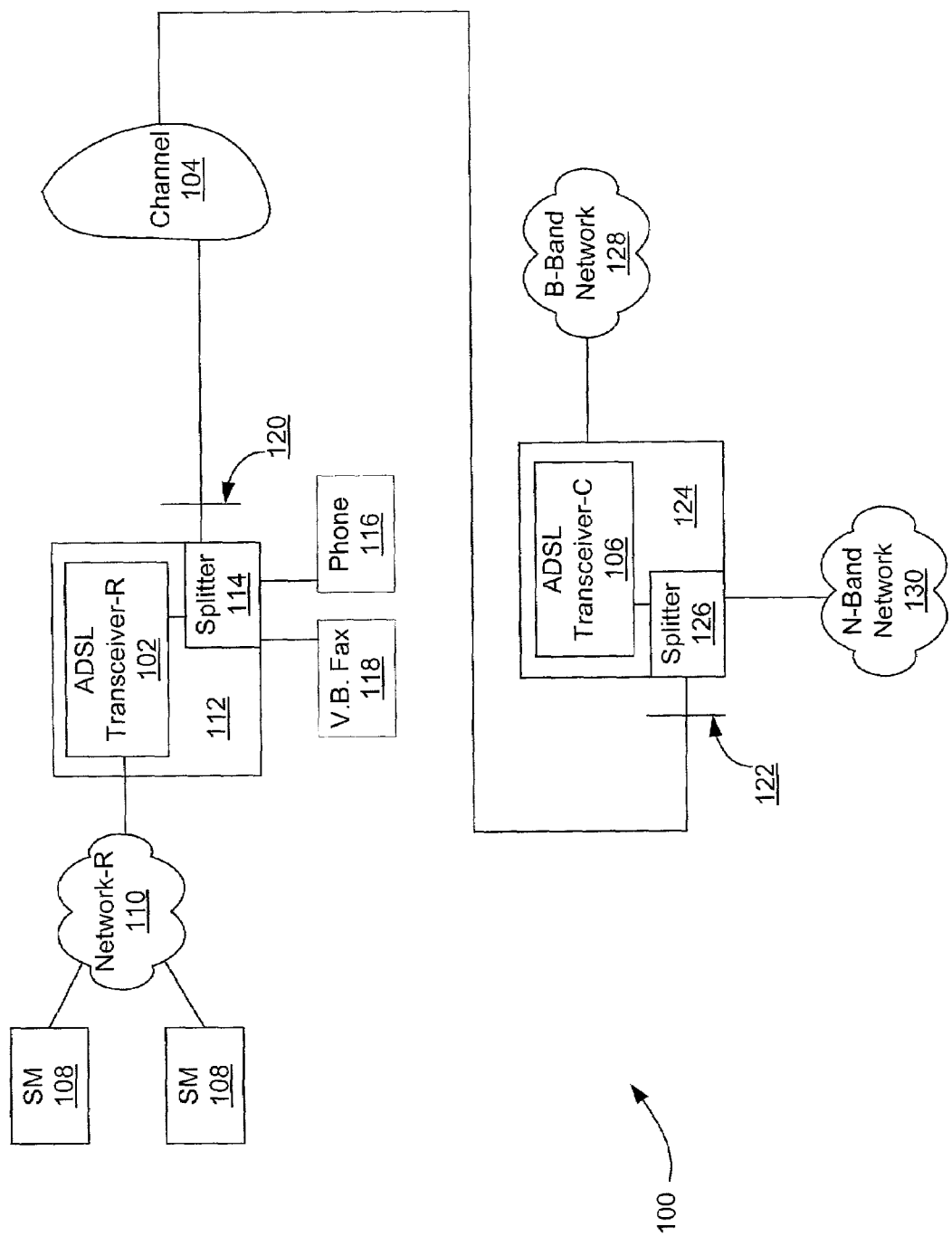
FIG. 1 is a block diagram of an ADSL transceiver system including an ADSL remote transceiver and an ADSL central transceiver.

The discrete multitone interleaver system and associated methods of the present invention will be specifically described hereafter in the context of three embodiments, each with a transmitter and a receiver, which are intended to be possible nonexclusive examples of implementations. Numerous other embodiments are envisioned and are possible, as will be apparent to those with skill in the art.

The discrete multitone interleaver system of the present invention allows trellis coding over multiple DMT tones. Although not limited to this particular application and any particular number of tones, the discrete multitone interleaver system is particularly suited for use in connection with modems at opposing ends of telephone connections (wire pairs) extending between a central office (CO); defined as any facility having a telephone switch) associated with a telephone company and a customer premises (CP). The modems can employ any suitable modulation scheme, for example but not limited to, that prescribed by the industry standard V.34 that has been promulgated by the International Telecommunications Union (ITU). Many CPs already have two-wire pairs connecting them to the CO. The discrete multitone interleaver system can effectively average the noise over multiple tones, for example, eight different tones, yielding better performance and longer DSL reach between the CO and CP equipment. In some cases, the discrete multitone interleaver system provides data throughput where none was possible otherwise.

Note that in the preferred embodiments, as described hereafter, the transmitters and receivers can be implemented in hardware, software, firmware, or a combination thereof. Preferably, all of the component parts of each, except the amplifier and transformer elements, are implemented in firmware that is stored in a memory (EPROM) and that is executed by a suitable instruction execution system, particularly, a digital signal processor (DSP) or general purpose microprocessor. The software/firmware can be stored and transported on any computer readable medium. If implemented in hardware, in whole or in part, as in alternative embodiments, the hardware components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in figures should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The discrete multitone interleaver program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
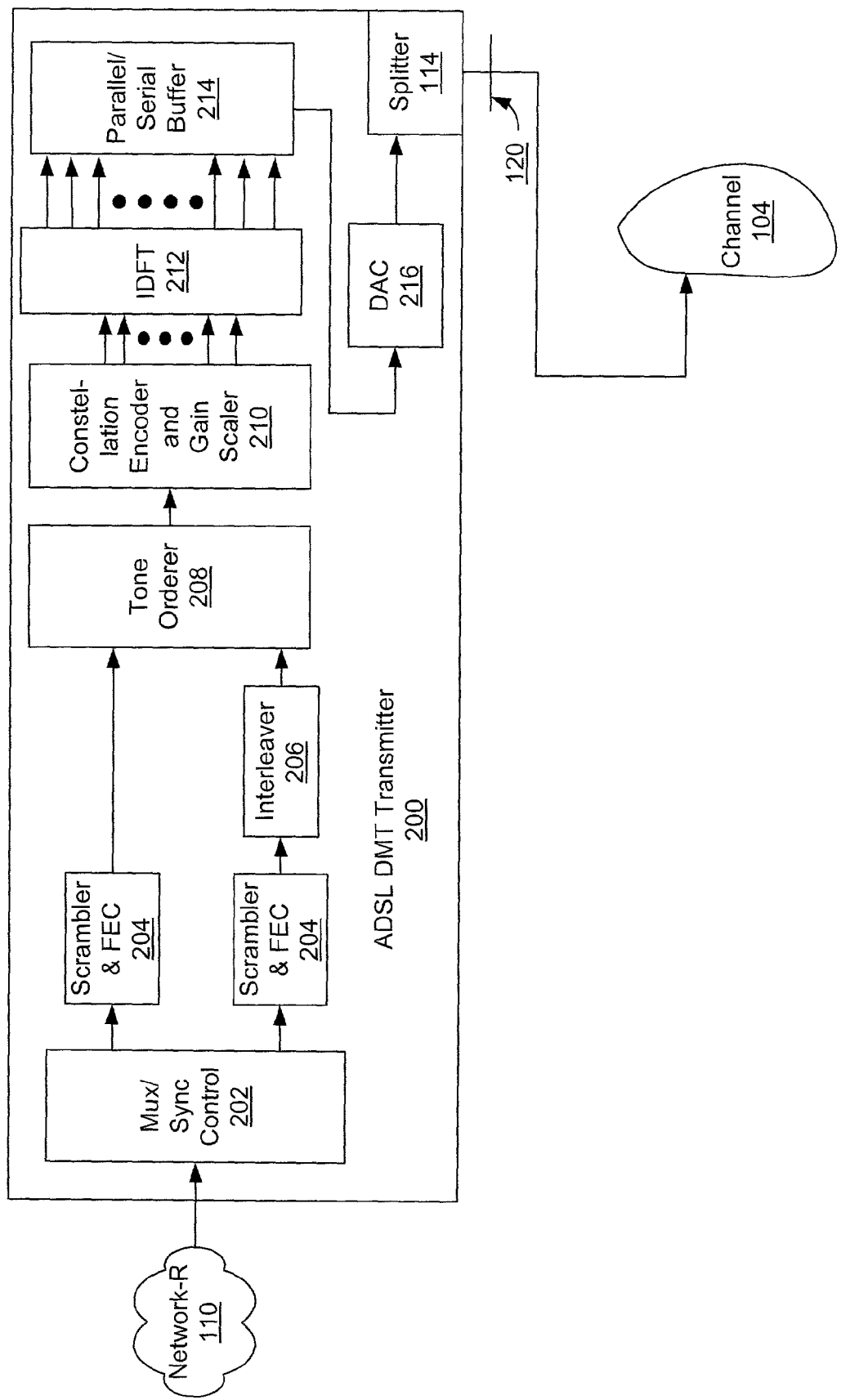
FIG. 2 is a block diagram of an ADSL DMT transmitter that resides in the ADSL remote transceiver and the ADSL central transceiver of FIG. 1. The ADSL DMT transmitter includes a constellation encoder and gain scaler.
Figure 9:
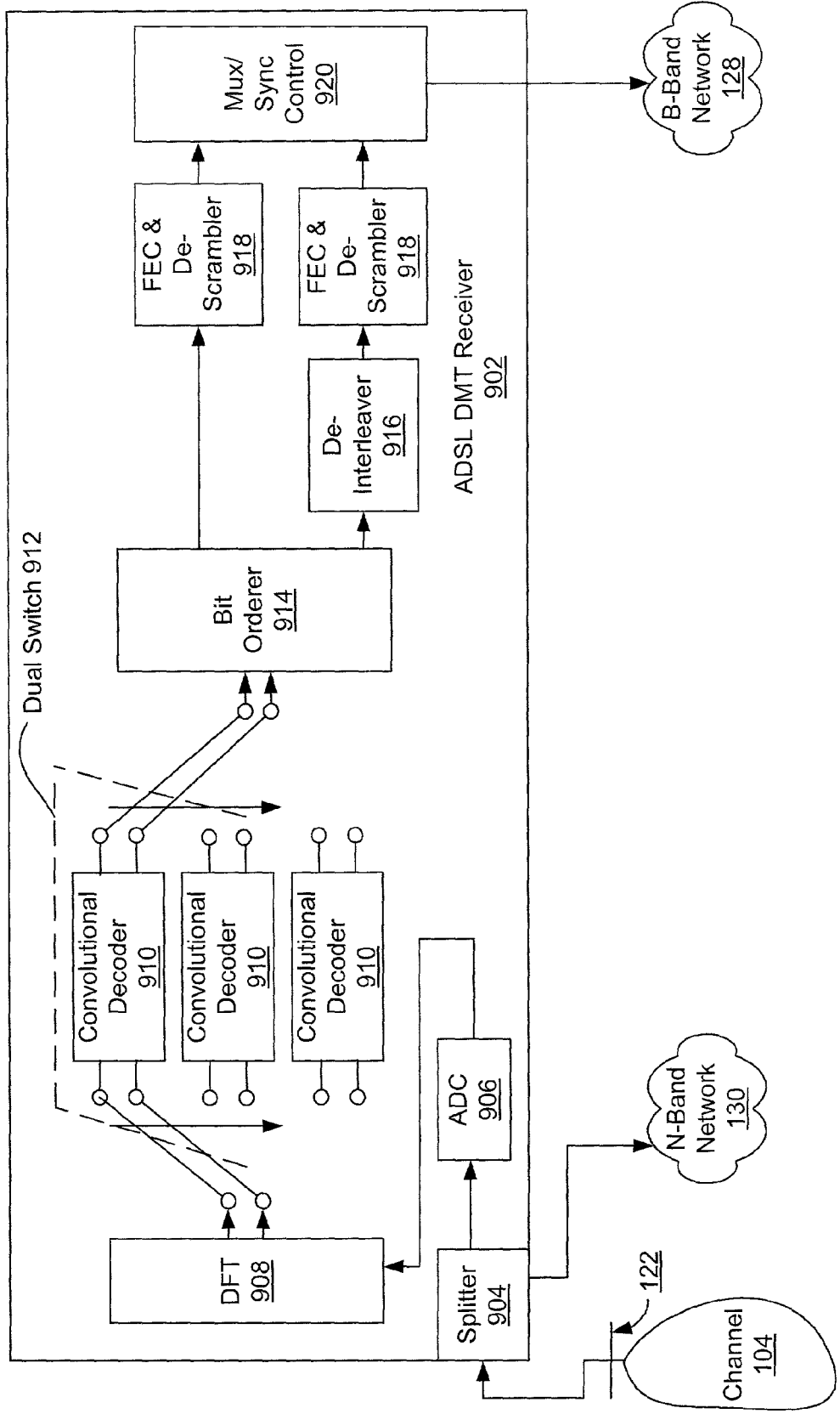
FIG. 9 is a block diagram of a discrete multitone interleaver for decoding and deinterleaving DMT symbols coded and interleaved by the first or the second embodiments of the discrete multitone interleaver of FIGS. 5 and 7.

FIGS. 1–3, 5, and 6 show a first embodiment of the discrete multitone interleaver. FIGS. 1, 2, and 7 show a second embodiment of the discrete multitone interleaver. FIG. 9 shows a first embodiment of the discrete multitone deinterleaver for deinterleaving data processed by either the first or second embodiments of the discrete multitone interleaver.

Figure 8:
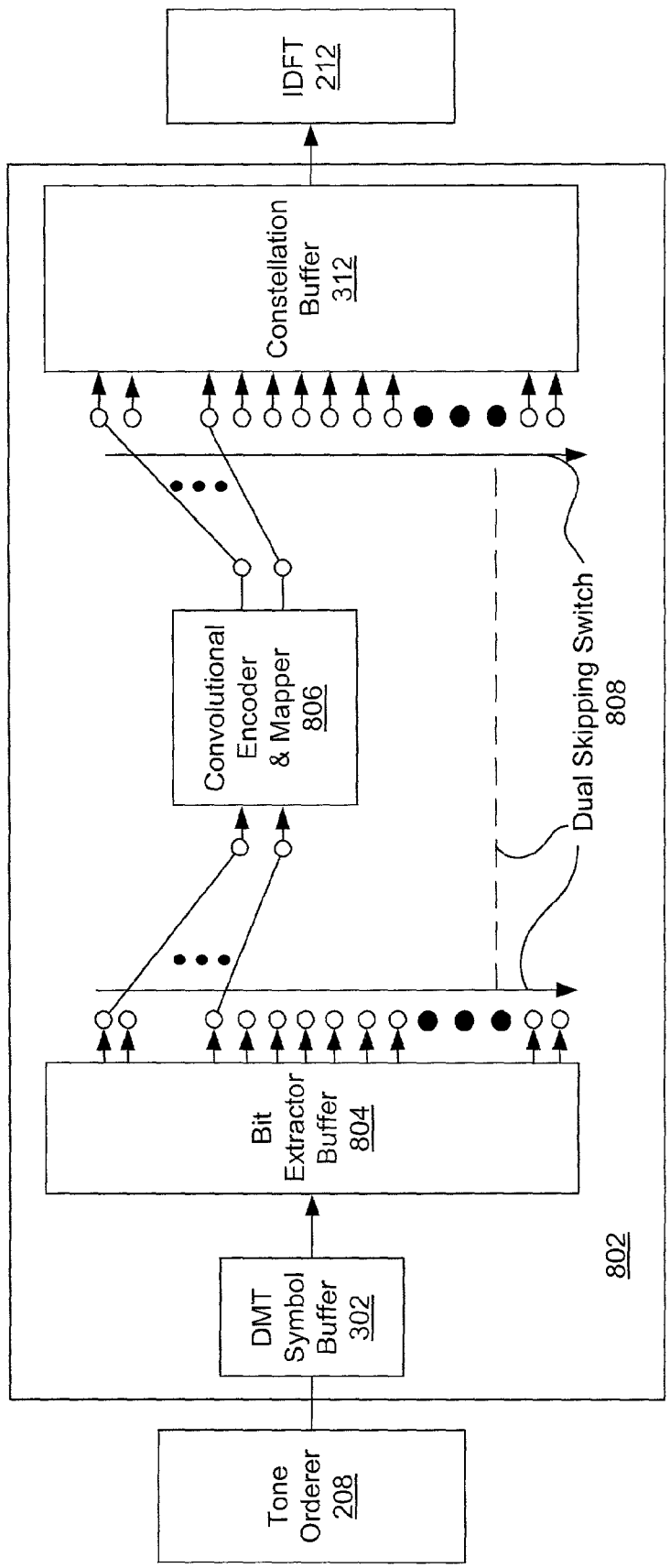
FIG. 8 is a block diagram of the constellation encoder and gain scaler of FIG. 2 showing a preferred embodiment of the discrete multitone interleaver.
Figure 10:
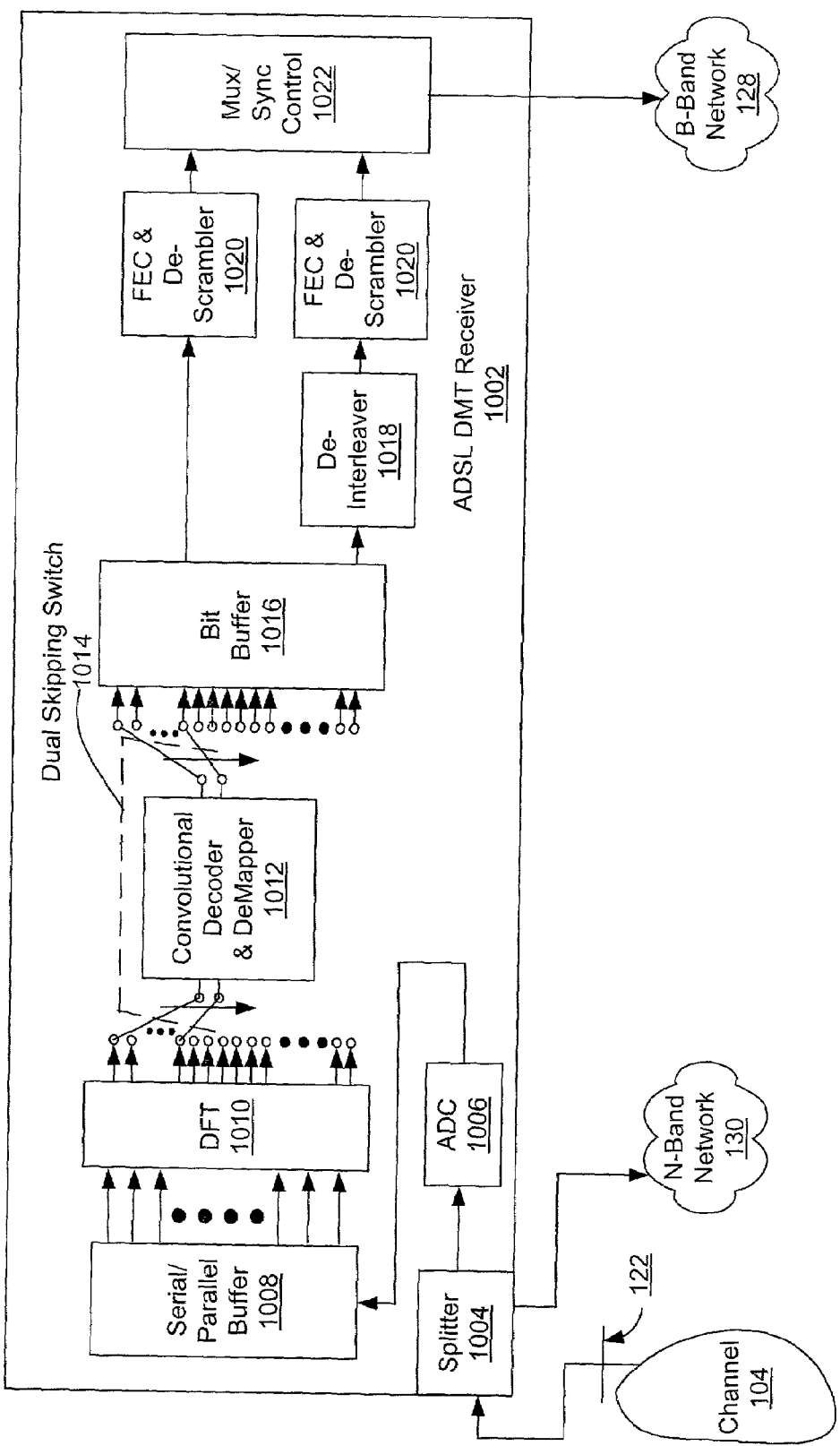
FIG. 10 is a block diagram of a discrete multitone deinterleaver for decoding and deinterleaving DMT symbols coded and interleaved by the preferred embodiment of the discrete multitone interleaver of FIG. 8.

FIGS. 1, 2, and 8 show the preferred embodiment of the discrete multitone interleaver. FIG. 10 shows the preferred embodiment of the discrete multitone deinterleaver for deinterleaving data processed by the preferred embodiment of the discrete multitone interleaver.

FIG. 1 shows a block diagram of an ADSL DMT transceiver system 100 showing the basic functional blocks and interfaces. The ADSL transceiver system includes an ADSL remote transceiver (ADSL Transceiver-R) 102, a channel 104, and an ADSL central transceiver (ADSL Transceiver-C) 106. The ADSL Transceiver-R 102 is typically housed in an ADSL DMT modem 112. The ADSL Transceiver-C 106 is typically housed in a Digital Subscriber Line Access Multiplexer (DSLAM) 124. ADSL DMT transceiver system 100 shows a transmission system and method for data transport. Remote power feeding, which may be provided by the ADSL Transceiver-C 106 is not shown.

In the ADSL DMT transceiver system 100, an ADSL circuit connects ADSL Transceiver-R 102 and ADSL Transceiver-C 106 on each end of a twisted-pair telephone line, creating three information channels—a high speed downstream channel, a medium speed duplex channel, and a plain old telephone service (POTS) channel. The POTS channel is split off from the digital modems by filters, thus guaranteeing uninterrupted POTS. The high speed channel ranges from 1.5 to 8 Mbps, while duplex rates range from 16 Kbps to 1 Mbps. Each channel can be submultiplexed to form multiple, lower rate channels.

The ADSL Transceiver-R 102 is typically located at a customer's premise and the ADSL Transceiver-C 106 is typically located at a telephone company's central office or remote location. As is known in the art, the ADSL Transceiver-C 106 acts as a master to some functions of the ADSL Transceiver-R 102. In a typical application, transmitter and receiver components will be incorporated into the same device so that each is capable of transmitting and receiving data. The discrete multitone interleaver and associated discrete multitone deinterleaver are incorporated into an ADSL transmitter and an ADSL receiver at each end of the channel 104.

The ADSL Transceiver-R 102 includes an ADSL DMT transmitter 200, described in detail below and shown in FIG. 2, and an ADSL DMT receiver that embodies the discrete multitone interleaver shown in FIGS. 9 or 10. For ease in describing the ADSL transceiver system 100, the detailed description is provided from the perspective of passing information from the transmitter in the ADSL Transceiver-R 102 to the receiver in the ADSL Transceiver-C 106. Those skilled in the art will recognize an analogous analysis applies to the transmission of information from the ADSL Transceiver-C 106 to the ADSL Transceiver-R 102.

The ADSL DMT modem 112 may also contain a splitter 114 and other components known to those skilled in the art. The input to the ADSL Transceiver-R 102 may be a remote network (Network-R) 110. The remote network 110 may include service modules (SMs) 108. The service modules 108 may be personal computers, servers, routers, and many other devices known to those skilled in the art. A standard phone 116, a voice band facsimile (V.B. Fax) 118, and an ISDN device may be connected to the splitter 114. The splitter 114 contains filters that separate high frequency ADSL signals from voiceband signals such as the standard phone 116, the facsimile 118, and the ISDN device.

Prior to entering the channel 104, the signal from the ADSL DMT modem 112 passes through a loop interface remote terminal end (U-R) 120. The U-R 120 may be Synchronous Transfer Mode (STM) bit sync based or Asynchronous Transfer Mode (ATM) cell based.

The output of the U-R 120 is passed through the channel 104 to the loop interface central office end (U-C) 122. As with the U-R 120, U-C 122 may be Synchronous Transfer Mode (STM) bit sync based or Asynchronous Transfer Mode (ATM) cell based.

The ADSL DMT transmitter 200, within the ADSL Transceiver-R 102, processes the service module 108 and Network-R 110 signals for transmission to the ADSL DMT receiver, within the ADSL Transceiver-C 106, via the channel 104. The ADSL DMT transmitter 200 processing includes the DMT interleaving of the current invention. The ADSL DMT receiver de-processes the signal and passes the deprocessed signals to the Broadband (B-Band) Network 128 and the Narrowband (N-Band) network 130. The ADSL Transceiver-C 106 is housed in the DSLAM 124 along with a DSLAM splitter 126 and other components known to those skilled in the art. The ADSL DMT receiver, housed in the ADSL Transceiver-C 106, de-processing includes the discrete multitone deinterleaving of the current invention.

FIG. 2 is a block diagram of an ADSL DMT transmitter 200 that resides in the ADSL Transceiver-R 102 and the ADSL Transceiver-C 106 of FIG. 1. The basic functional blocks of the ADSL DMT transmitter 200 are shown in FIG. 2. It should be noted that the components shown in FIG. 2 are not all required to construct a DMT transmitter. Instead, the components are models for facilitating the construction of DMT signal waveforms. Those waveforms may be constructed in a variety of ways including by hardware, software, and firmware.

The ADSL DMT transmitter 200 receives input(s) from service modules 108 or remote network(s) 110. The multiplexor synchronous control (Mux/Sync Control) 202 accepts the inputs and converts the inputs into multiplexed and synchronized data frames (mux data frames). The multiplexor synchronous control 202 generates the mux data frames at a nominal 4 kbaud.

The mux data frame output of the Mux/Sync Control 202 passes to the tone orderer 208 by one of two paths each carrying a binary data stream. The first binary data stream is a "fast" path that provides low latency. The second binary data stream is interleaved and provides a low error rate and results in a higher latency. Both paths are processed by a scrambler and forward error corrector (FEC) 204.

The FEC is generally a Reed-Solomon coder. The scramblers, within the Scrambler & FECs 204, are applied to the binary data streams without reference to any framing or symbol synchronizations. Descrambling in the ADSL DMT receiver can likewise be performed independent of symbol synchronization. The interleaved path is processed by an interleaver 206 in addition to a scrambler and FEC 204. The interleaver 206 convolutionally interleaves the Reed-Solomon codewords. The depth of the interleaving varies, but it is consistently a power of 2. The FEC can reliably correct occasional errors if the data is interleaved. However, the FEC is not effective in correcting all (sin x)/x distortion.

Both binary data stream paths are also processed by cyclical redundancy checks (CRCs) that are not shown in FIG. 2. The output of both paths is in the form of FEC data frames generated at the DMT symbol rate. An FEC data block may span more than one DMT symbol.

The fast and interleaved paths lead to the tone orderer 208. The tone orderer 208 combines data frames from the fast and the interleaved paths into combined tone ordered data symbols on DMT tones. The tone orderer first places bits from the fast and interleaved paths into an original bit table $b_i$ and then orders the bits in an ordered bit table $b'_i$. The tone orderer 208 assigns bits from the fast path to the tones with the smallest number of bits assigned to them and then assigns the bits from the interleaved path to the remaining tones. Some tones may have a mixture of bits from the fast and interleaved paths.

The tone ordered data symbols are passed to the constellation encoder and gain scaler 210. The constellation encoder and gain scaler 210 converts the tone ordered data frames into coded bits on DMT tones. The constellational encoder, within the constellation encoder and gain scaler 210, is similar to a Quadrature Amplitude Modulation (QAM) encoder. The performance of the constellation encoder and gain scaler 210 is improved by block processing Wei's 16-state, 4-dimensional trellis code. The number of bits per tone and the relative gains to be used for every tone are calculated by the ADSL DMT receiver and sent to the ADSL DMT transmitter 200 according to a protocol defined by ITU standards. A further description of the constellation encoder and gain scaler 210 is provided below in reference to FIG. 3.

The coded bits on DMT tones from the constellation encoder and gain scaler 210 are passed on to the Inverse Discrete Fourier Transformer (IDFT) 212. The IDFT 212 combines the QAM constellations and converts the bits on the DMT tones to output samples. The output samples are converted to a serial stream by the parallel/serial buffer 214.

The serial stream from the parallel/serial buffer 214 is passed to a digital to analog converter (DAC) 216. The DAC 216 and associated analogue processing blocks (not shown) construct a continuous transmit voltage waveform corresponding to the discrete digital input samples from the IDFT 212.

The analogue signal passes through the splitter 114 and the U-R 120 and enters the channel 104.

Figure 3:
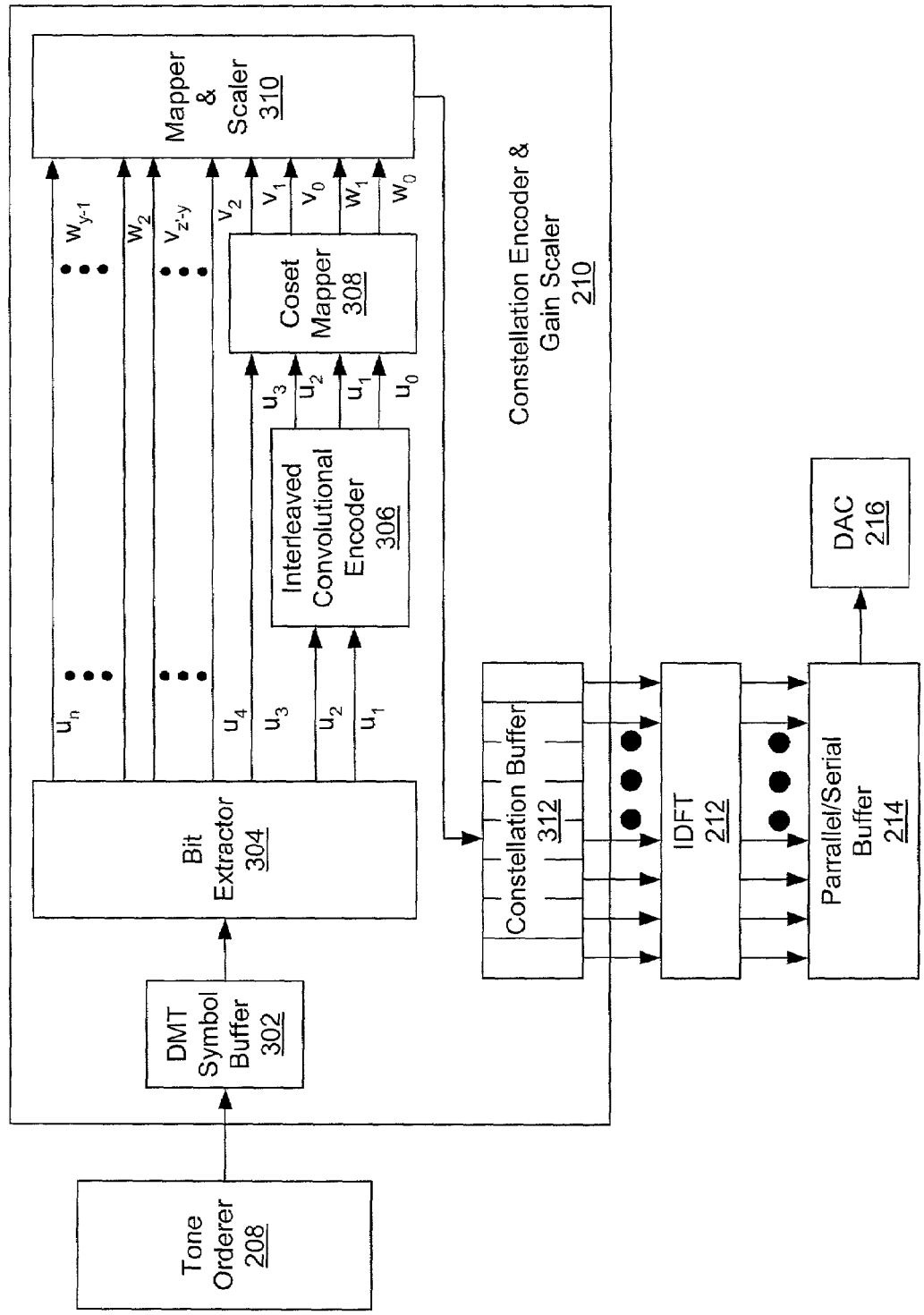
FIG. 3 is a block diagram of the constellation encoder and gain scaler of FIG. 2 showing a first embodiment of the discrete multitone interleaver.

FIG. 3 is a block diagram of the constellation encoder and gain scaler 210 of FIG. 2 showing a first embodiment of the discrete multitone interleaver. In FIG. 3, the tone ordered data bits, to be encoded as constellation symbols on DMT tones, ordered according to ordered bit table $b'_i$, are received from the tone orderer 208 by a DMT symbol buffer 302.

Data bits from the DMT symbol buffer 302 are extracted by a bit extractor 304 based on the bit table $b'_i$. The extraction is based on pairs of consecutive $b'_i$ due to the 4-dimensional nature of the code. Each tone has 2 to 15 coded bits. The total bits from the pair of consecutive $b'_i$ form the binary word u. The binary word u is shown in FIG. 3 as the output of the bit extractor 304 $u_1$ to $u_n$.

The two least significant bits, $u_1$ and $u_2$, of the binary word u are passed on to an interleaved convolutional encoder 306. Through a process detailed below and shown by FIG. 5, the convolutional encoder outputs three bits—$u_0$, $u_1$, and $u_2$. The two least significant bits of the binary word u, $u_1$ and $u_2$, pass through the convolutional encoder unchanged.

Bits $u_0$, $u_1$, $u_2$, and $u_3$, enter a coset mapper 308 where the four bits are labeled and partitioned by a process known as mapping by set-partitioning. The result is a conversion from a 4-dimensional coset to a union of two Cartesian products of two 2-dimensional cosets designated in FIG. 3 by $w_0$, $w_1$, $v_0$, and $v_1$.

The output from the bit extractor 304, less $u_1$, $u_2$, and $u_3$, is combined with the output of the coset mapper 308 to form two binary words, $v=(v_{z'-y}, \ldots, v_0)$ and $w=(w_{y-l}, \ldots, w_0)$. Binary words v and w are used by the mapper and scaler 310 to look up two constellation points in an encoder constellation table. The mapper and scaler 310 also applies gain scaling as requested by the ADSL DMT receiver. The output of the mapper and scaler 310 is 255 complex values of $Z_i$.

The two constellation points from the mapper and scaler 310 are passed to a constellation buffer 312. The constellation buffer 312 outputs the coded bits on DMT tones representing 255 complex values of $Z_i$. The IDFT 212 accepts the coded bits on DMT tones and modulates the 255 complex values of $Z_i$ by generating real values of $x_n$ as output samples. The output samples are converted to a serial stream by the parallel/serial buffer 214.

The output of the parallel/serial buffer 214 is passed to the DAC 216. The DAC 216 and associated analogue processing blocks (not shown) construct a continuous transmit voltage waveform corresponding to the discrete digital input samples from the IDFT 212.

Figure 4:
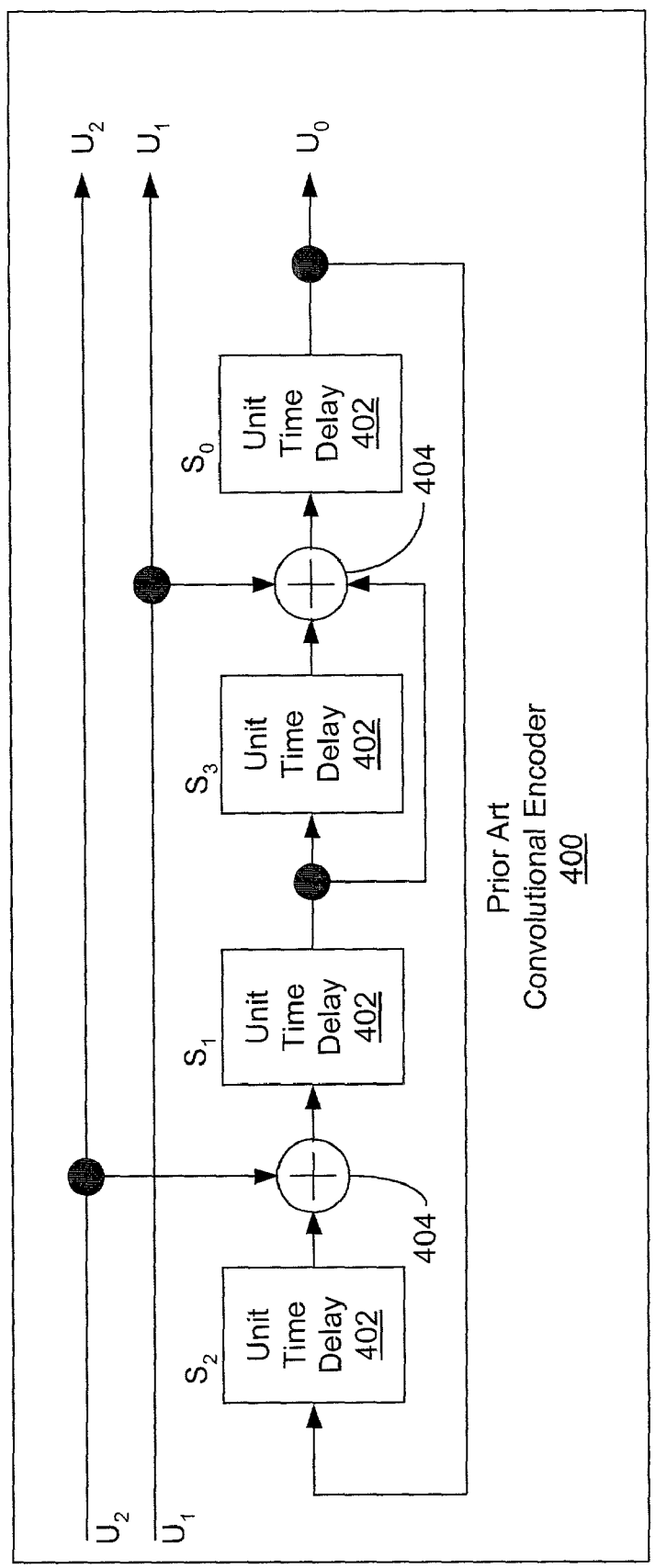
FIG. 4 is a block diagram of a prior art convolutional encoder.

FIG. 4 is a block diagram of a prior art convolutional encoder 400. The prior art convolutional encoder 400 receives an input of two bits, $u_1$ and $u_2$, from the bit extractor 304. The prior art convolutional encoder 400 passes through the two input bits, $u_1$ and $u_2$, and calculates a new bit, $u_0$, based in part on the two input bits and in part on previous input bits. The prior art convolutional encoder 400 calculates $u_0$ using logic gates 404 and unit time delays 402.

In the prior art, the last two 4-dimensional symbols in the DMT symbol are chosen to force the convolutional encoder to the zero state, i.e. $S_1=0$, $S_2=0$, $S_3=0$, and $S_4=0$. This is accomplished by forcing the least significant bits, $u_1$ and $u_2$, of the binary word u to $u_1 = S_1 \oplus S_3$, and $u_2 = S_2$. This means the least significant bits, $u_1$ and $u_2$, of the last two symbols cannot carry data.

Figure 5:
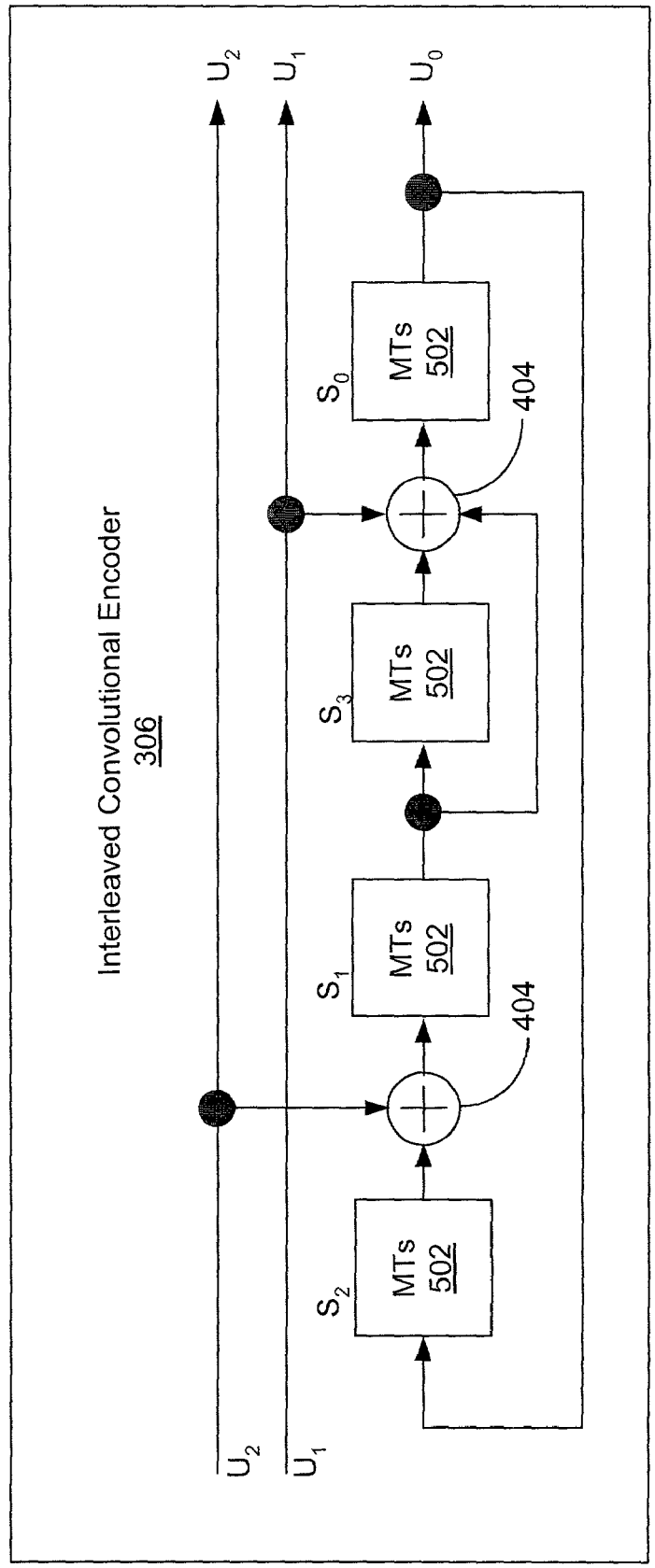
FIG. 5 is a block diagram of the interleaved convolutional encoder of FIG. 3.

FIG. 5 is a block diagram of the interleaved convolutional encoder 306 of FIG. 3. Similar to the prior art convolutional encoder 400, the interleaved convolutional encoder 306 receives an input of two bits, $u_1$ and $u_2$, from the bit extractor 304. The interleaved convolutional encoder 306 also passes through the two input bits, $u_1$ and $u_2$, and calculates a new bit, $u_0$, based in part on the two input bits and in part on previous input bits. The prior art convolutional encoder 400 also calculates $u_0$, using logic gates 404. However, the interleaved convolutional encoder 306 uses MTs variable unit time delays 502 instead of the unit time delays 402 of the prior art. The use of the $MT_S$ variable unit time delays 502 effectively interleaves the DMT symbols across the tones. The $MT_S$ variable unit time delays 502 cause consecutively generated trellis symbols to fall on tones that are separated by M tones between them. The interleaved convolutional encoder 306 operates so that consecutively generated constellations are not mapped to adjacent tones.

The variability of the $MT_S$ variable unit time delays 502 may be dynamically controlled by the ADSL DMT receiver. The ADSL DMT receiver may calculate the number of unit time delays, and therefore the depth of the interleaving, by calculating the error rate of previous transmissions and sending a request for greater interleaving depth via a protocol such as R-B&G. R-B&G is well known to those skilled in the art for transportation of bits and gain information from the ADSL receivers to ADSL transmitters.

As noted in regard to FIG. 4, in the prior art the last two 4-dimensional symbols in the DMT symbols are generally chosen to force the convolutional encoder to a zero state. In the prior art, the last two symbols cannot carry data. However, with the interleaved convolutional encoder 306, presetting all the variable unit time delay elements of the state machine to zero prior to the start of each data frame will accomplish the same result and allow the least significant bits, $u_1$ and $u_2$, of the last 2 M data symbols to carry data. Optionally, the last 2 M data symbols can be chosen to force the convolutional encoder to the zero state, as in the prior art.

Figure 6:
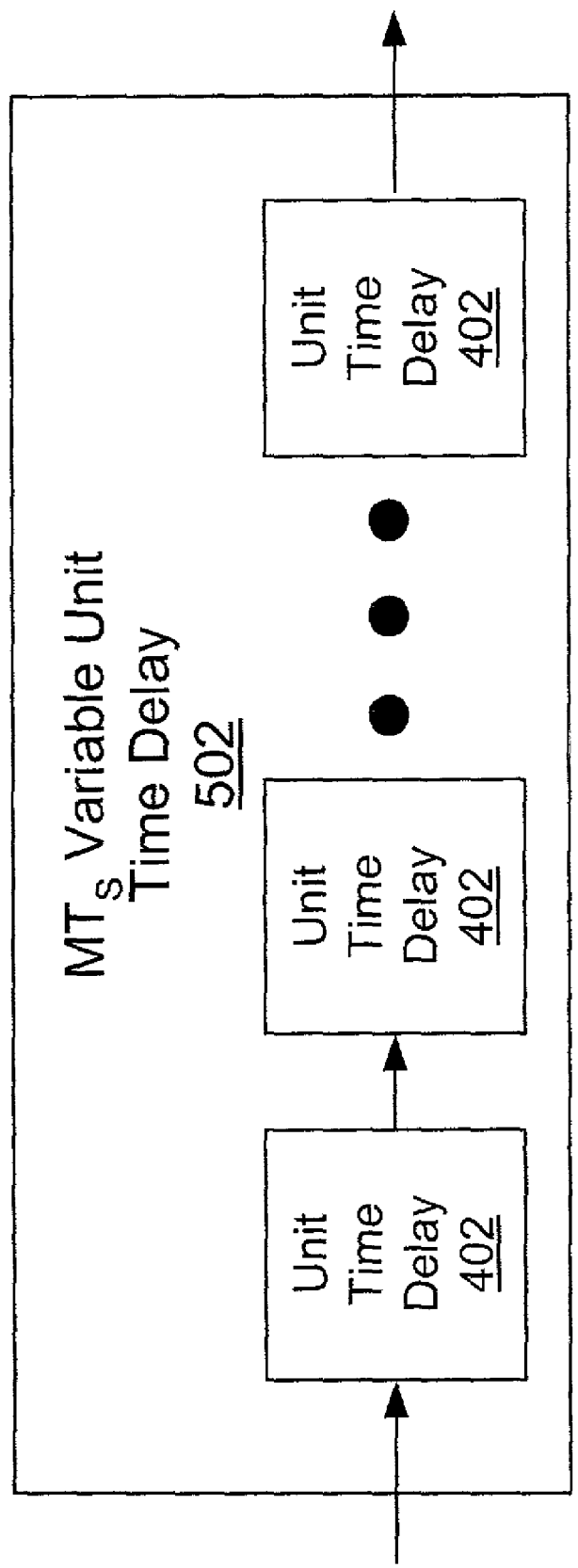
FIG. 6 is a block diagram of the variable unit time delay of the convolutional encoder of FIG. 5.
Figure 7:
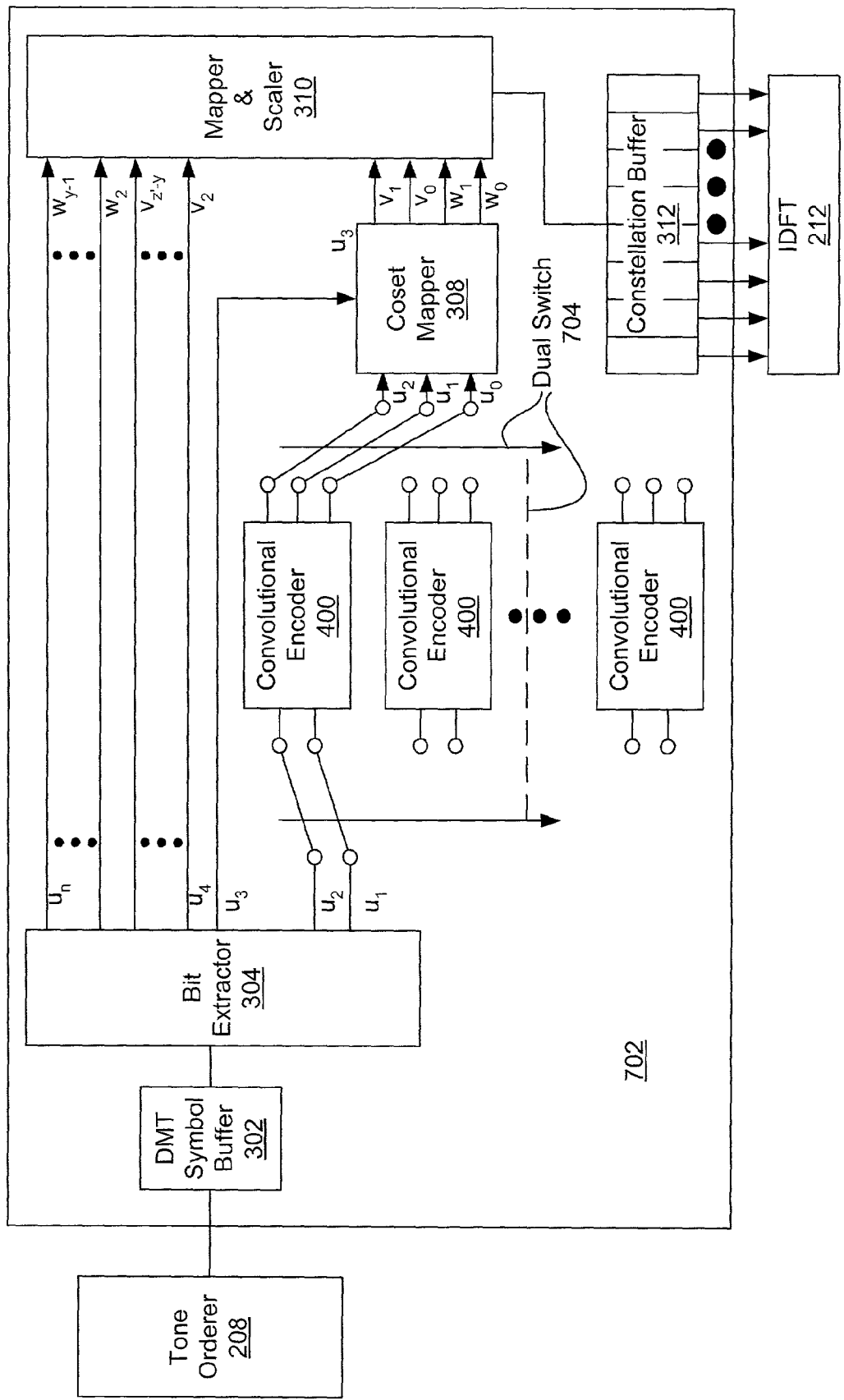
FIG. 7 is a block diagram of the constellation encoder and gain scaler of FIG. 2 showing a second embodiment of the discrete multitone interleaver.

FIG. 6 is a block diagram of the $MT_S$ variable unit time delay 502 of the interleaved convolutional encoder 306 of FIG. 5. FIG. 6 shows the $MT_S$ variable unit time delay 502 is a variable number of unit time delays 402.

FIG. 7 is a block diagram of the constellation encoder and gain scaler of FIG. 2 showing a second embodiment of the discrete multitone interleaver 702. In FIG. 7, the tone ordered data bits, to be encoded as constellation symbols on DMT tones, ordered according to ordered bit table $b'_i$, are received from the tone orderer 208 by a DMT symbol Buffer 302.

Data bits from the DMT symbol buffer 302 are extracted by the bit extractor 304 based on the bit table $b'_i$. The extraction is based on pairs of consecutive $b'_i$ due to the 4-dimensional nature of the code. Each tone has 2 to 15 coded bits. The total bits from the pair of consecutive $b'_i$ form the binary word u. The binary word u is shown in FIG. 7 as the output of the bit extractor 304 $u_1$ to $u_n$.

The two least significant bits, $u_1$ and $u_2$, of the binary word u are passed on to the input of a synchronized dual switch 704 that passes the two least significant bits onto one of a variable number of prior art convolutional encoders 400. The prior art convolutional encoders 400 output three bits, $u_0$, $u_1$, and $u_2$, that are passed on to the coset mapper 308 through the output of the synchronized dual switch 704. The operation of the coset mapper 308, the mapper and scaler 310, the constellation buffer 312 and the IDFT 212, are similar to their operation in the constellational encoder and gain scaler 210 of FIG. 3.

The second embodiment of the discrete multitone interleaver 702 causes consecutive trellis symbols to fall on tones that are segregated by the number of convolutional encoders 400 used in the second embodiment of the discrete multitone interleaver 702. The number of convolutional encoders 400 used may be dynamically controlled by the ADSL DMT receiver. The convolutional encoders 400 of the second embodiment of the discrete multitone interleaver 702 may be forced to a zero state by presetting the state machines to zero prior to the start of each data frame. Optionally, the last 2 M data symbols can be chosen to force the convolutional encoders to the zero state, as in the prior art.

FIG. 8 is a block diagram of the constellation encoder and gain scaler of FIG. 2 showing a preferred embodiment of the discrete multitone interleaver 802. In FIG. 8, the tone ordered data bits, to be encoded as constellation symbols on DMT tones, ordered according to ordered bit table $b'_i$, are received from the tone orderer 208 by a DMT symbol Buffer 302.

Data bits from the DMT symbol buffer 302 are extracted by the bit extractor buffer 804 based on the bit table $b'_i$. The extraction is based on pairs of consecutive $b'_i$ due to the 4-dimensional nature of the code. Each tone has 2 to 15 coded bits. The total bits from the pair of consecutive $b'_i$ form the binary word u. The bit extractor buffer 804 outputs consecutive binary words u.

The binary words u are passed on to the input of a synchronized dual skipping switch 808. Those skilled in the art are familiar with the operation of synchronized dual skipping switches and related skipping commutators. The synchronized dual skipping switch 808 is capable of skipping over consecutive binary words u according to the depth of the interleaving desired. The synchronized dual skipping switch 808 passes on the selected binary words u to a convolutional encoder and mapper 806. The synchronized dual skipping switch 808 is synchronized on the input and output so the correct bits always map to the correct "original" tones but the convolutional encoder, within the convolutional encoder and mapper 806, does not pick up consecutive bits for adjacent tones. The number of tones skipped by the synchronized dual skipping switch 808 may be dynamically controlled by the ADSL DMT receiver.

The convolutional encoder and mapper 806 includes a prior art convolutional encoder 400, a coset mapper 308, and a mapper. The convolutional encoder and mapper 806 may also include a gain scaler.

The convolutional encoder and mapper 806 passes on an interleaved, convolutionally encoded, and mapped signal, in the form of two constellation points to a constellation buffer 312. The constellation buffer 312 passes on the two constellation points in the original tone order to the IDFT 212. Optionally, the constellation buffer 312 may include the gain scalers.

The operation of the coset mapper 308, the mapper, a gain scaler if used, the constellation buffer, and the IDFT, are similar to their operation in the constellation encoder and gain scaler 210 of FIG. 3.

As in the prior art, the last two 4-dimensional symbols in the DMT symbol are chosen to force the convolutional encoder to the zero state, i.e. $S_0=0$, $S_1=0$, $S_2=0$, and $S_3=0$. This is accomplished by forcing the least significant bits, $u_1$ and $u_2$, of the binary word u to $u_1=S_1 \oplus S_3$, and $u_2=S_2$. This means the least significant bits, $u_1$ and $u_2$, of the last two symbols cannot carry data. Optionally, presetting the unit time delay elements of the state machine to zero prior to the start of each data frame will accomplish the same result and allow the last two data symbols to carry data.

Though several embodiments of the discrete multitone interleaver have been described, any system for selecting points out of order by switching the input to the convolutional encoder will effectively interleave the DMT data symbols. Selecting points out of order may be done on consecutive points or may be done randomly.

The data bytes from the DMT symbol buffer 302 are stored in a bit extractor buffer 804 in accordance with the re-ordered bit allocation table $b'_i$. In normal operation the convolutional encoder, within the convolutional encoder and mapper 806, may process these bits directly in sequential order as in the prior art.

The discrete mutltitone interleaver may be optional. If the optional skipping convolutional ordering is enabled then the convolutional encoder, within the convolutional encoder and mapper 806, will process these bits in a new non-sequential order. The optional skip variable m will determine the new order. The following sequence defines the new order for k active tones:

1 Encode bits for tone 1; place in constellation buffer 312 for tone 1.
2 Encode bits for tone m+1; place in constellation buffer 312 for tone m+1.
3 Encode bits for tone 2m+1; place in constellation buffer 312 for tone 2m+1.
4 Continue until beyond the last active tone, k.
5 Encode bits for tone 2; place in constellation buffer 312 for tone 2.
6 Encode bits for tone m+2; place in constellation buffer 312 for tone m+2.
7 Encode bits for tone 2m+2; place in constellation buffer 312 for tone 2m+2.
8 Continue until beyond the last active tone, k.
9 Encode bits for tone 3; place in constellation buffer 312 for tone 3.
10 Encode bits for tone m+3; place in constellation buffer 312 for tone m+3.
11 Encode bits for tone 2m+3; place in constellation buffer 312 for tone 2m+3.
12 Continue until beyond the last active tone, k.
13 Repeat this process until all k active tones have been encoded.

This skipping convolutional encoder ordering assures that consecutive encoded symbols are not used to encode adjacent tones. This protects the convolutional decoder from correlated noise that may result from (sin x)/x cross coupling of the tones. The constraint length of the 16-state 4-dimension trellis code used in DMT is four 4-dimension symbols or 8 tones. One useful value for m is k/8 for k active tones. This provides a maximum separation between tones for consecutive convolutional encoder symbols. Another useful value is m=4 which spans only 4 tones corresponding to the bandwidth of anticipated interfering AM broadcast stations. This gives the greatest number of trellis symbols between adjacent tones.

The preferred embodiment of the discrete multitone interleaver 802 can be used in place of, or in addition to, the original tone ordering function which constructs the re-ordered bit allocation table $b'_i$. The original function encoded the denser constellations last to ensure they came from the interleaved path, which provides better impulse protection in the Reed-Solomon code. The assignment of bits to tones should remain the same as specified for tone ordering. The preferred embodiment of the discrete multitone interleaver 802 simply modifies the order in which the tones are processed by the trellis encoder. Bits and tone assignments remain the same.

The preferred embodiment of the discrete multitone interleaver 802 has one additional advantage. It uses a single convolutional encoder and memory. Thus, only one decoder must be purged in the receiver when the last two 4-dimension symbols are forced to the zero state as required by the specification. When using multiple encoders then all must be forced to the zero state at the end of each DMT symbol period. Forcing the last states reduces the number of information bits conveyed and reduces margin. The preferred embodiment of the discrete multitone interleaver 802 and the preferred embodiment of the discrete multitone deinterleaver do not require additional memory but do require the switching logic that implements the skipping order.

FIG. 9 is a block diagram of a discrete multitone interleaver for decoding and deinterleaving DMT symbols coded and interleaved by the first or the second embodiments of the discrete multitone interleaver of FIGS. 5 and 7. The ADSL DMT receiver 902 receives an input signal at a splitter 904 from the channel 104 and through the U-C 122. The signal includes narrowband signals that are split by the splitter 904 and sent to the N-Band network 130.

The broadband portion of the signal from the channel 104 is processed by an analog to digital (ADC) converter 906 and a serial/parallel converter (not shown) and demodulated by a Discrete Fourier Transformer (DFT) 908. DFT 908 includes complimentary gain scaling to that in the transmitter mapper and scaler 310. A synchronized dual switch 912 passes the demodulated signal to a number of convolutional decoders 910 equivalent in depth of the interleaver used to encode the signal. The convolutional decoders 910 include a Viterbi decoder. The synchronized dual switch 912 passes the output of each convolutional decoder 910 to a bit orderer 914. The bit orderer 914 performs a complementary re-ordering procedure from that performed by the tone orderer 208.

The fast and the interleaved portions of the signal are segregated and sent down separate paths to the Mux/Sync Control 920. The interleaved path is processed by a deinterleaver 916 and an FEC and De-Scrambler 918. The fast path is only processed by an FEC and De-Scrambler 918. The Mux/Sync Control 920 passes the deinterleaved and convolutionally decoded signal to the B-Band Network 128.

FIG. 10 is a block diagram of a discrete multitone deinterleaver for decoding and deinterleaving DMT symbols coded and interleaved by the preferred embodiment of the discrete multitone interleaver of FIG. 8. The ADSL DMT receiver 1002 receives an input signal at a splitter 1004 from the channel 104 and through the U-C 122. The signal includes narrowband signals that are split by the splitter 1004 and sent to the N-Band network 130.

The broadband portion of the signal from the channel 104 is processed by an analog to digital (ADC) converter 1006 and a serial/parallel converter 1008 and demodulated by a DFT 1010. DFT 1010 includes complimentary gain scaling to that in the transmitter convolutional encoder and mapper 806 or constellation buffer 312. A synchronized dual skipping switch 1014 passes the demodulated signal to the convolutional decoder and demapper. The convolutional decoder within the convolutional decoder and demapper 1012 includes a Viterbi decoder. The synchronized dual skipping switch 1014 passes the mapped and convolutionally decoded signal to a bit buffer 1016. The bit buffer 1016 performs a complementary re-ordering procedure from that performed by the tone orderer 208 and temporarily stores the result for continued processing.

The fast and the interleaved portions of the signal are segregated and sent down separate paths to the Mux/Sync Control 1022. The interleaved path is processed by a deinterleaver 1018 and an FEC and De-Scrambler 1020. The fast path is only processed by an FEC and De-Scrambler 1020. The Mux/Sync Control 1022 passes the deinterleaved and convolutionally decoded signal to the B-Band Network 128.

Those skilled in the art will recognize there may be additional components involved in processing signals beyond those shown in the FIGS. 1–10. In particular, there may be components involved in processing the signal between the DFTs 908 and 1010 and the convolutional decoders 910 and 1012 (with associated mapper); and between the convolutional decoders 910 and 1012 (with associated mapper) and the bit orderer 914 or the bit buffer 1016. These additional components do not alter the basic invention as described in FIGS. 1 and 10.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the discrete multitone interleaver without departing substantially from the spirit and principles of the invention. All such modifications and variations are intended to be included herein within the scope of this disclosure and the present invention and protected by the following claims.

Therefore, having thus described the invention, at least the following is claimed:

1. A method for transmitting data, comprising the steps of:
   (a) receiving a first plurality of bits on a first tone from a bit extractor buffer through a synchronized dual skipping switch;
   (b) receiving a second plurality of bits on a second tone from the bit extractor through the synchronized dual skipping switch, wherein the second tone is not adjacent to the first tone;
   (c) convolutionally encoding the first and second pluralities of bits; and
   (d) outputting the convolutionally encoded first and second pluralities of bits through the synchronized dual skipping switch.

2. The method of claim 1, further comprising:
   (e) mapping the convolutionally encoded first and second pluralities of bits.

3. The method of claim 2, further comprising:
   (f) buffering the mapped and convolutionally encoded first and second pluralities of bits.

4. The method of claim 1, wherein the first and second tones are separated by a variable number of tones.

5. The method of claim 4, wherein the variable number of tones is determined by a receiver.

6. The method of claim 1, wherein the first and second pluralities of bits are DMT symbols.

* * * * *